(12) United States Patent
Sugihara

(10) Patent No.: US 10,942,114 B2
(45) Date of Patent: Mar. 9, 2021

(54) ATOMIC ABSORPTION SPECTROPHOTOMETER AND ATOMIC ABSORPTION MEASUREMENT METHOD

(71) Applicant: Shimadzu Corporation, Kyoto (JP)

(72) Inventor: Kazuo Sugihara, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/641,816

(22) PCT Filed: Aug. 31, 2017

(86) PCT No.: PCT/JP2017/031307
§ 371 (c)(1),
(2) Date: Feb. 25, 2020

(87) PCT Pub. No.: WO2019/043858
PCT Pub. Date: Mar. 7, 2019

(65) Prior Publication Data
US 2020/0225148 A1 Jul. 16, 2020

(51) Int. Cl.
*G01N 21/31* (2006.01)
*G01J 3/42* (2006.01)

(52) U.S. Cl.
CPC ............ *G01N 21/3103* (2013.01); *G01J 3/42* (2013.01)

(58) Field of Classification Search
None
See application file for complete search history.

(56) References Cited

U.S. PATENT DOCUMENTS

2012/0182555 A1* 7/2012 Statz .................... G01J 3/26
356/437
2015/0068981 A1* 3/2015 Ormeci Beckers ..... C02F 11/14
210/709

(Continued)

FOREIGN PATENT DOCUMENTS

| JP | H03-295446 A | 12/1991 |
|----|--------------|---------|
| JP | H07-011484 A | 1/1995 |
| JP | 2001-153799 A | 6/2001 |

OTHER PUBLICATIONS

International Search Report with English translation and Written Opinion with Machine translation dated Nov. 14, 2017 in corresponding International Application No. PCT/JP2017/031307; 9 pages.

(Continued)

*Primary Examiner* — Shawn Decenzo
(74) *Attorney, Agent, or Firm* — Maier & Maier, PLLC

(57) ABSTRACT

A storage unit stores first and second calibration curves. The first calibration curve represents a relationship between an absorbance of a first standard sample for light at a wavelength $\lambda_1$ and a concentration of a target composition in the first standard sample. The second calibration curve represents a relationship between an absorbance of a second standard sample for light at a wavelength $\lambda_2$ and a concentration of the target composition in the second standard sample. The second standard sample has a higher concentration than that of the first standard sample. When the absorbance of the unknown sample for the light at the wavelength $\lambda_1$ is less than a threshold, a concentration measurement processing unit measures a concentration of the target composition in the unknown sample, based on the absorbance of the unknown sample for the light at the wavelength $\lambda_1$ and the first calibration curve.

4 Claims, 5 Drawing Sheets

(56) References Cited

U.S. PATENT DOCUMENTS

| | | | |
|---|---|---|---|
| 2016/0054281 A1* | 2/2016 | Smeeton | G01N 21/33 250/373 |
| 2018/0172554 A1* | 6/2018 | Palanganda Poonacha | G01J 3/021 |
| 2019/0025200 A1* | 1/2019 | Yang | B01J 19/0033 |
| 2019/0317013 A1* | 10/2019 | Weidman | G01J 3/08 |
| 2020/0158648 A1* | 5/2020 | Kobayashi | G01N 21/714 |

OTHER PUBLICATIONS

Office Action dated Jul. 14, 2020 in corresponding Japanese Office Action No. 2019-538839; 6 pages including English-language translation.

* cited by examiner

ATOMIC ABSORPTION SPECTROPHOTOMETER AND ATOMIC ABSORPTION MEASUREMENT METHOD

TECHNICAL FIELD

The present invention relates to an atomic absorption spectrophotometer and an atomic absorption measurement method, in which an unknown sample is atomized and irradiated with light and a concentration of the unknown sample is measured based on an absorbance obtained.

BACKGROUND ART

Flame-type atomic absorption spectrophotometers are one known example of atomic absorption spectrophotometers. In a flame-type atomic absorption spectrophotometer, a mixture of fuel gas and supporting gas is burned with a burner to form a flame (or make a fire). Then, a sample is sprayed into the flame and thereby atomized, after which the flame is irradiated with measuring light. In this way, an absorbance of the atomized sample is measured.

When the atomic absorption measurement is made, a calibration curve that represents a relationship between concentration and absorbance of a sample is used. When the concentration of the sample falls within a low range, the calibration curve tends to exhibit good linearity. However, when the concentration falls within a high range, the calibration curve tends to exhibit poor linearity, from which it may be difficult to obtain precise measurements. Thus, when the concentration of the sample becomes high, its absorbance is usually lowered by adjusting the angle at which the burner forms with the optical axis of the measuring light so that the light path of the measuring light passing through the flame is shortened (see Patent Document 1).

In another known method of measuring an atomic absorption of a sample having a high concentration, the sample is diluted to lower its absorbance. By lowering the concentration of the sample in this manner, the absorbance can be measured within a range where the calibration curve exhibits good linearity.

PRIOR ART DOCUMENT

Patent Document

Patent Document 1: JP No. 07-11484 B

SUMMARY OF THE INVENTION

Problems to be Solved by the Invention

In the first method of lowering the absorbance, the angle at which the burner forms with the optical axis of the measuring light is usually adjusted manually. In this case, an error is likely to occur in the adjusted angle, which may disadvantageously fail to provide measurements with good repeatability.

In the second method of lowering the absorbance, a dilution error is likely to occur in the sample, which may disadvantageously cause a measurement error. In addition, when absorptions of a plurality of samples are measured, each individual sample needs to be diluted. This process may involve complicated measurement procedures.

The present invention, which has been made in view of the above circumstances, provides an atomic absorption spectrophotometer and an atomic absorption measurement method, both of which enable precise measurement to be made with simple procedures.

Means for Solving the Problems (1) An atomic absorption spectrophotometer according to a first aspect of the present invention is one that atomizes an unknown sample, irradiates the unknown sample with light, and measures a concentration of a target composition in the unknown sample, based on an absorbance of the unknown sample. This atomic absorption spectrophotometer includes a storage unit and a concentration measurement processing unit. The storage unit stores a first calibration curve and a second calibration curve. The first calibration curve represents a relationship between an absorbance of a first standard sample for light at a first wavelength and a concentration of a target composition in the first standard sample. The second calibration curve represents a relationship between an absorbance of a second standard sample for light at a second wavelength and a concentration of the target composition in the second standard sample. The second standard sample has a higher concentration than that of the first standard sample; the second wavelength differs from the first wavelength. When the absorbance of the unknown sample for the light at the first wavelength is less than a threshold, the concentration measurement processing unit measures the concentration of the target composition in the unknown sample, based on the absorbance of the unknown sample for the light at the first wavelength and the first calibration curve. When the absorbance of the unknown sample for the light at the first wavelength is equal to or more than the threshold, the concentration measurement processing unit measures the concentration of the target composition in the unknown sample, based on the absorbance of the unknown sample for the light at the second wavelength and the second calibration curve.

According to the above configuration, when the absorbance of the unknown sample for the light at the first wavelength is less than the threshold, the atomic absorption spectrophotometer measures the concentration of the target composition in the unknown sample in a conventional manner, more specifically, based on the absorbance of the unknown sample for the light at the first wavelength and the first calibration curve. In this case, the atomic absorption spectrophotometer makes the measurement within a range in which the calibration curve exhibits good linearity, and precise measurement thereby can be made. When the absorbance of the unknown sample for the light at the first wavelength is equal to or more than the threshold, the atomic absorption spectrophotometer irradiates the unknown sample with light at a second wavelength different from the first wavelength, thereby lowering the absorbance. In this case, the atomic absorption spectrophotometer can also precisely measure the concentration of the target composition in the unknown sample by using the second calibration curve that represents the relationship between the absorbance of the second standard sample and the concentration of the target composition in the second standard sample; the first standard sample has a higher concentration than that of the first standard sample.

As described above, the atomic absorption spectrophotometer switches the wavelength of the light with which the unknown sample is to be irradiated, depending on the absorbance of the unknown sample, thereby successfully making precise measurement for the unknown sample even if the unknown sample has a high concentration. In addition, if measuring a plurality of unknown samples, the atomic absorption spectrophotometer does not have to dilute each individual unknown sample, thereby successfully suppressing an occurrence of a dilution error and complication of measurement procedures.

(2) The atomic absorption spectrophotometer may further include a first calibration curve creation processing unit and a second calibration curve creation processing unit. The first calibration curve creation processing unit may create the first calibration curve and store the first calibration curve in the storage unit. The second calibration curve creation processing unit may create the second calibration curve and store the second calibration curve in the storage unit. In this case, when the absorbance of the unknown sample for the light at the first wavelength is equal to or more than the threshold, the second calibration curve creation processing unit may create the second calibration curve and store the second calibration curve in the storage unit.

According to the above configuration, the second calibration curve creation processing unit may create the second calibration curve only when the absorbance of the unknown sample for the light at the first wavelength is equal to or more than the threshold. Therefore, if the absorbance of the unknown sample for the light at the first wavelength is less than the threshold, the second calibration curve creation processing unit does not have to create the second calibration curve, thereby suppressing complication of measurement procedures.

(3) The concentration measurement processing unit may irradiate, with the light at the second wavelength, only one or more of a plurality of unknown samples whose respective absorbances for the light at the first wavelength are equal to or more than the threshold, and may measure concentrations of the target composition in the irradiated unknown samples based on the absorbances of the irradiated unknown samples and the second calibration curve.

According to the above configuration, when measuring a plurality of unknown samples, the atomic absorption spectrophotometer may irradiate, with the light at the second wavelength, only one or more unknown samples whose respective absorbances for the light at the first wavelength are equal to or more than the threshold. Then, based on the absorbances of the irradiated unknown samples and the second calibration curve, the atomic absorption spectrophotometer may measure concentrations of the target composition in the irradiated unknown samples. Therefore, when measuring a plurality of unknown samples, if the absorbances of all the unknown samples for the light at first wavelength are less than the threshold, the atomic absorption spectrophotometer does not have to switch the wavelength of the light with which the unknown samples are to be irradiated. This successfully suppresses complication of measurement procedures.

(4) An atomic absorption measurement method according to a second aspect of the present invention is one of atomizing an unknown sample, irradiating the unknown sample with light, and measuring a concentration of a target composition in the unknown sample based on an absorbance of the unknown sample. This atomic absorption measurement method includes a calibration curve creating step, a second calibration curve creating step, and a concentration measuring step. In the first calibration curve creating step, a first calibration curve that represents a relationship between an absorbance of a first standard sample for light at a first wavelength and a concentration of the target composition in the first standard sample is created. In the second calibration curve creating step, a second calibration curve that represents a relationship between an absorbance of a second standard sample for light at a second wavelength and a concentration of the target composition in a second standard sample is created. The second standard sample has a higher concentration than that of the first standard sample; the second wavelength differs from the first wavelength. In the concentration measuring step, when the absorbance of the unknown sample for the light at the first wavelength is less than a threshold, the concentration of the target composition in the unknown sample is measured based on the absorbance of the unknown sample for the light at the first wavelength and the first calibration curve. In the concentration measuring step, when the absorbance of the unknown sample for the light at the first wavelength is equal to or more than the threshold, the concentration of the target composition in the unknown sample is measured based on the absorbance of the unknown sample for the light at the second wavelength and the second calibration curve.

(5) The second calibration curve creating step may include a step of, when the absorbance of the unknown sample for the light at the first wavelength is equal to or more than the threshold, creating the second calibration curve.

(6) The concentration measuring step may include a step of irradiating, with the light at the second wavelength, only one or more of a plurality of unknown samples whose respective absorbances for the light at the first wavelength are equal to or more than the threshold, and measuring concentrations of the target composition in the irradiated unknown samples based on the absorbances of the irradiated unknown samples and the second calibration curve.

Effects of the Invention

With the present invention, it is possible to change a wavelength of light with which an unknown sample is to be irradiated, depending on an absorbance of the unknown sample, thereby suppressing complication of measurement procedures and successfully making precise measurement.

MODE FOR CARRYING OUT THE INVENTION

1. Overall Configuration of Atomic Absorption Spectrophotometer

Figure 1:
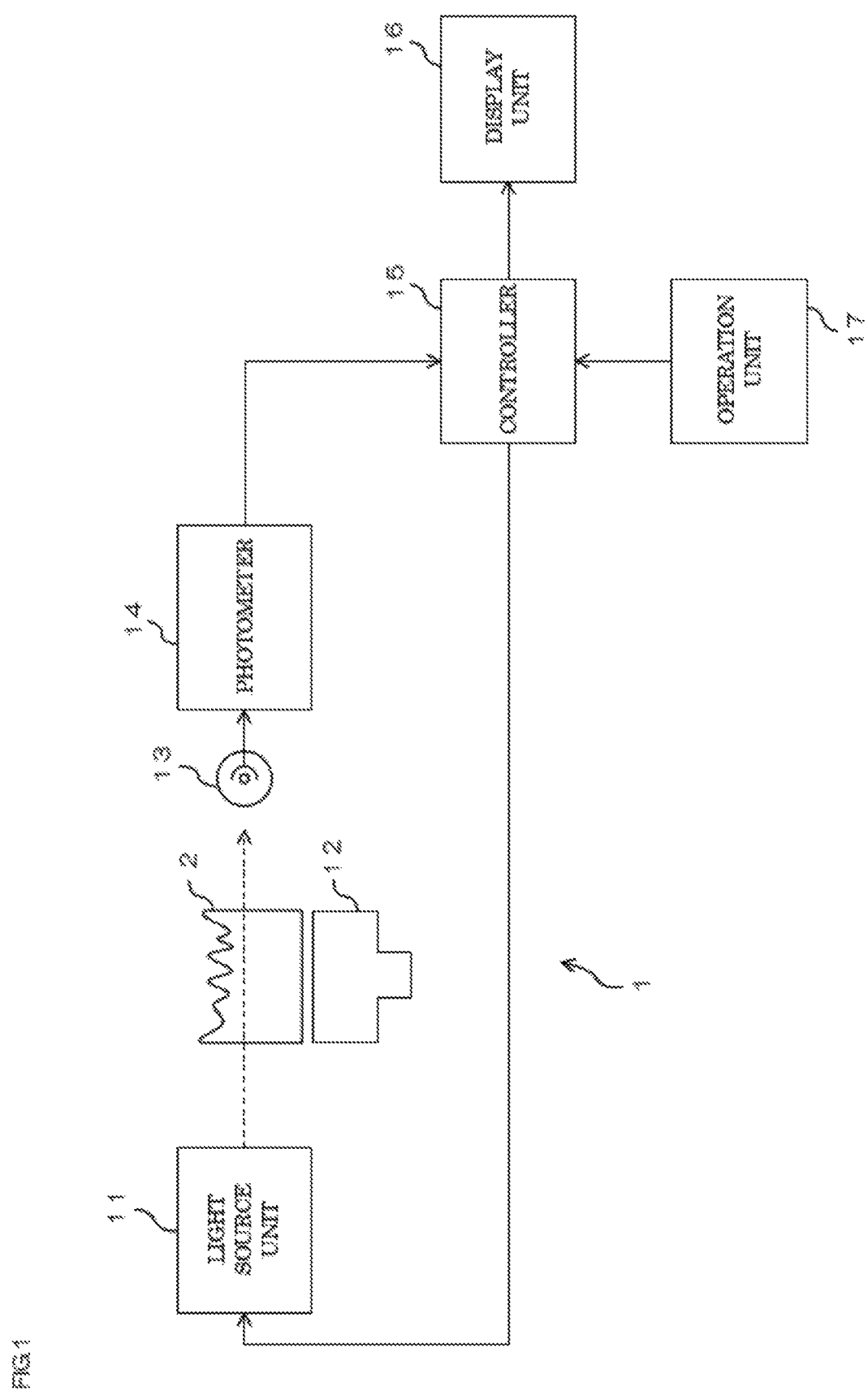
FIG. 1 is a schematic diagram of a configuration example of an atomic absorption spectrophotometer according to an embodiment of the present invention.

FIG. 1 is a schematic diagram of a configuration example of an atomic absorption spectrophotometer 1 according to an embodiment of the present invention. The atomic absorption spectrophotometer 1 is a flame-type atomic absorption spectrophotometer. In this atomic absorption spectrophotometer, a mixture of fuel gas and supporting gas is burned to form a flame 2. Then, a sample is sprayed into the flame 2 and thereby atomized, after which an atomic absorption of the atomized sample is measured.

The atomic absorption spectrophotometer 1 includes a light source unit 11, an atomization unit 12, a detector 13, a photometer 14, a controller 15, a display unit 16, an operation unit 17, and the like. In FIG. 1, the solid arrows indicate the flows of signals, and the broken arrow indicates the flow of light.

The light source unit 11 includes a light source, such as a hollow cathode lamp, that emits light with a bright-line spectrum. The light source unit 11 further includes a monochromator 111 (see FIG. 4) that changes the wavelength of the light emitted from the light source. The monochromator 111 serves as an example of a wavelength changer that causes the light source unit 11 to emit light at a desired wavelength as measuring light.

The light emitted from the light source unit 11 reaches the flame 2. When the light reaches the flame 2, a light component at a specific wavelength is absorbed in a composition contained in the atomized sample inside the flame 2. The light from which the light component at the specific wavelength has been absorbed in this manner passes through the flame 2 and is detected by the detector 13.

The atomization unit 12 is supplied with the fuel gas, the supporting gas, and the sample. The fuel gas may be acetylene gas ($C_2H_2$), for example. The supporting gas may be air or nitrous oxide gas ($N_2O$), for example. However, the fuel gas and the supporting gas are not limited to such gases.

In the atomization unit 12, the fuel gas and the supporting gas are combined together to generate the mixture, and then the mixture is burned. As a result, the flame 2 is continuously formed during analysis. The sample is formed into a mist, and then the mist is blended into the mixture. After that, the mixture is supplied into the flame 2. In this way, the sample is sprayed into the flame 2 and atomized by the heat of the flame 2.

The detector 13 may include a photomultiplier tube, for example. After having passed through the flame 2, the light is detected by the detector 13. Then, the detector 13 converts the light into an analog electric signal in accordance with the light intensity and outputs this signal. The photometer 14 amplifies the signal received from the detector 13 and converts this signal into a digital electric signal by A/D conversion.

The controller 15 performs a process of measuring a concentration of a composition in the sample, based on the signal received from the detector 13 via the photometer 14. Herein, this sample is referred to as the unknown sample because the concentration of the target composition in this sample is unknown. More specifically, a light component at a specific wavelength which is contained in the light is absorbed in the composition in the sample. Thus, the controller 15 can make the calculation by using a calibration curve that represents the relationship between concentration and absorbance of the composition in the sample, thereby measuring a concentration of the composition. In short, the atomic absorption spectrophotometer 1 atomizes an unknown sample, irradiates the unknown sample with light, and measures a concentration of a target composition, or a composition to be analyzed, in the unknown sample based on an absorbance of the unknown sample.

The controller 15 is connected to both the display unit 16 and the operation unit 17. The display unit 16, which may include a liquid crystal display (LCD), for example, displays the result in which the atomic absorption spectrophotometer 1 has measured the concentration of the sample and other information. The operation unit 17, which may include a keyboard and a mouse, for example, is operated by the user when he/she performs various settings.

2. Specific Configuration of Atomization Unit

Figure 2:
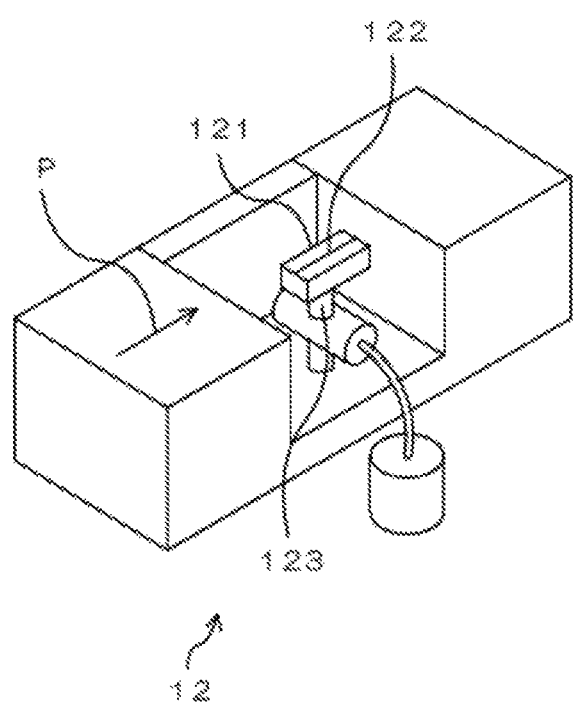
FIG. 2 is a perspective view of a concrete configuration of the atomization unit.

FIG. 2 is a perspective view of a concrete configuration of the atomization unit 12. The atomization unit 12 includes a burner 121 that burns the mixture of the fuel gas and the supporting gas. The burner 121, which has an elongated shape such as a rectangular parallelepiped shape, is disposed with its long side extending horizontally.

The burner 121 has an air outlet 122 on its upper surface; the air outlet 122 is formed so as to extend straightly along the long side of the burner 121. During the analysis, the mixture of the fuel gas and the supporting gas is continuously output from the burner 121 via the air outlet 122 and burned inside the atomization unit 12. As a result, the flame is formed so as to extend straightly along and above the air outlet 122.

The burner 121 is supported by a support shaft 123 disposed on its lower surface; the support shaft 123 extends vertically from the lower surface. In a conventional atomic absorption spectrophotometer, a support shaft 123 is rotatable. Thus, the burner 121 is manually rotatable around the support shaft 123, allowing the angle of an outlet 122 in the horizontal plane to be adjusted. In this embodiment, however, the support shaft 123 is fixed, in other words, not rotatable.

As illustrated in FIG. 2, the air outlet 122 extends along a light path P of the light emitted from the light source unit 11. As a result, the light from the light source unit 11 travels across the flame 2 formed above the air outlet 122.

3. Bright-Line Spectrum

Figure 3:
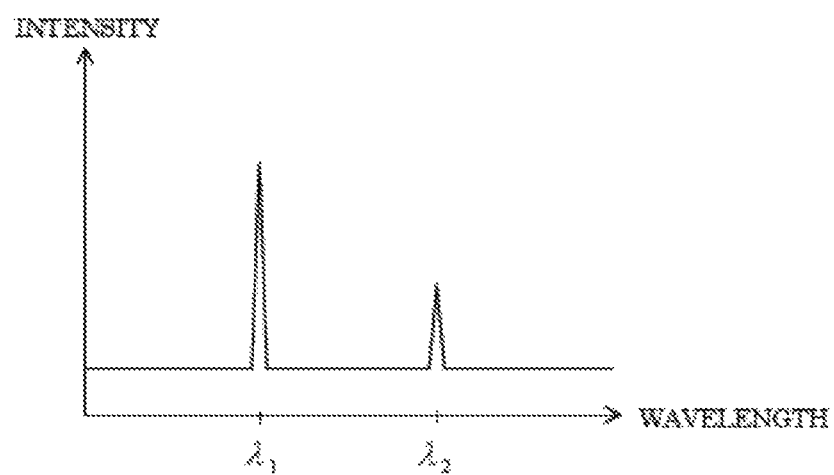
FIG. 3 is a schematic diagram of a bright-line spectrum of light emitted from the light source in the light source unit.

FIG. 3 is a schematic diagram of a bright-line spectrum of the light emitted from the light source in the light source unit 11. This bright-line spectrum has peaks at a plurality of wavelengths (at wavelengths $\lambda_1$ and $\lambda_2$ in this example). The monochromator 111 usually switches the wavelength of the light that the light source emits to the wavelength (e.g., wavelength $\lambda_1$) to which the target composition (element) has the highest sensitivity.

In this embodiment, the atomic absorption spectrophotometer 1 makes the measurement by using light at the wavelength $\lambda_1$ (first wavelength) to which the target composition has the highest sensitivity and, if necessary, also by using light at a second wavelength (e.g., wavelength $\lambda_2$), which differs from the first wavelength. In short, there are cases where the atomic absorption spectrophotometer 1 measures a concentration of a target composition in an unknown sample by using light at a wavelength differing from the wavelength to which the target composition has the highest sensitivity.

4. Concrete Configuration of Controller

Figure 4:
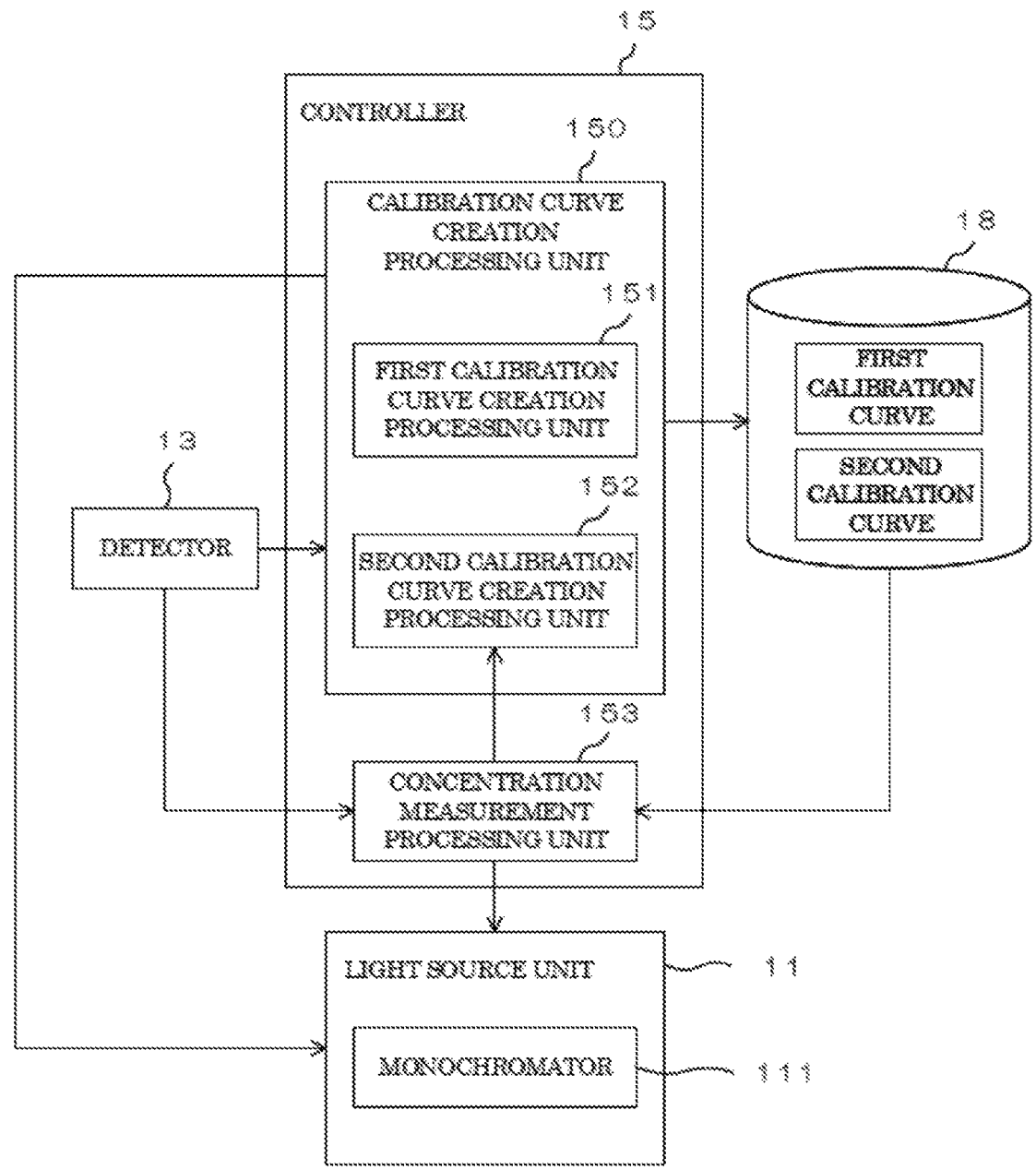
FIG. 4 is a block diagram of a concrete configuration of the controller.

FIG. 4 is a block diagram of a concrete configuration of the controller 15. The controller 15 may include a central processing unit (CPU), for example. When the CPU executes some programs, the controller 15 functions as a calibration curve creation processing unit 150, a concentration measurement processing unit 153, and some other processing units. Further, the calibration curve creation processing unit 150 includes a first calibration curve creation processing unit 151 and a second calibration curve creation processing unit 152. The controller 15 inputs/receives data to or from a storage unit 18, which includes a hard disk or a random access memory (RAM), for example.

The calibration curve creation processing unit 150 performs a process of creating calibration curves by using standard samples, each of which contains the target composition at a known concentration. More specifically, the calibration curve creation processing unit 150 conveys the standard samples from an autosampler (not illustrated) to the atomization unit 12. Then, the detector 13 detects the light that has passed through each of the atomized standard samples. Based on the detection signals from the detector 13, the calibration curve creation processing unit 150 makes calculation to create calibration curves that represent the relationships between the concentration and absorbance of the target composition in the standard samples. Meanwhile, the calibration curve creation processing unit 150 switches the wavelengths of the light emitted from the light source unit 11. In this embodiment, two standard samples (first and second standard samples) are used; these standard samples contain the same target composition at different concentrations.

The first calibration curve creation processing unit 151 makes the measurement by using the first standard sample. Based on the detection signal from the detector 13, the first calibration curve creation processing unit 151 creates a first calibration curve that represents a relationship between the absorbance of the first standard sample for the light at the wavelength $\lambda_1$ and the concentration of the target composition in the first standard sample. Then, the first calibration curve creation processing unit 151 stores data regarding the first calibration curve in the storage unit 18.

Likewise, the second calibration curve creation processing unit 152 makes the measurement by using the second standard sample that contains a higher concentration of target composition than that of the first standard sample. Based on the detection signal from the detector 13, the second calibration curve creation processing unit 152 creates a second calibration curve that represents a relationship between the absorbance of the second standard sample for the light at the wavelength $\lambda_2$ and the concentration of the target composition in the second standard sample. Then, the second calibration curve creation processing unit 152 stores data regarding the second calibration curve created in the storage unit 18.

The concentration measurement processing unit 153 performs a process of measuring a concentration of the target composition in the unknown sample by using the first or second calibration curve stored in the storage unit 18. More specifically, the concentration measurement processing unit 153 supplies an unknown sample from the autosampler (not illustrated) to the atomization unit 12. Then, the detector 13 detects the light that has passed through the atomized unknown sample. Based on the detection signal from the detector 13, the concentration measurement processing unit 153 measures a concentration of the target composition in the unknown sample. Meanwhile, the concentration measurement processing unit 153 switches the wavelengths of the light emitted from the light source unit 11.

In this embodiment, the atomic absorption spectrophotometer 1 makes the measurement by using any of the first and second calibration curves, depending on whether the absorbance of the unknown sample for the light at the wavelength $\lambda_1$ is less than a threshold. More specifically, when the absorbance of the unknown sample for the light at the wavelength $\lambda_1$ is less than the threshold, in other words, when the unknown sample has a low concentration, the atomic absorption spectrophotometer 1 measures a concentration of the target composition in the unknown sample, based on the first calibration curve and the absorbance of the unknown sample for the light at the wavelength $\lambda_1$. When the absorbance of the unknown sample for the light at the wavelength $\lambda_1$ is equal to or more than the threshold, in other words, when the unknown sample has a high concentration, the atomic absorption spectrophotometer 1 measures a concentration of the target composition in the unknown sample, based on the second calibration curve and the absorbance of the unknown sample for the light at the wavelength $\lambda_2$.

In this embodiment, the second calibration curve creation processing unit 152 may determine whether to perform a process of creating the second calibration curve, depending on the measurement received from the concentration measurement processing unit 153. More specifically, only when the absorbance of the unknown sample of the light at the wavelength $\lambda_1$ for is equal to or more than the threshold, the second calibration curve creation processing unit 152 may create the second calibration curve and stores this second calibration curve in the storage unit 18. If the atomic absorption spectrophotometer 1 measures concentrations of a plurality of unknown samples, when the absorbances of all the unknown samples for the light at the wavelength $\lambda_1$ are lower than the threshold, the second calibration curve creation processing unit 152 does not have to create the second calibration curves.

As a result of the above, when the absorbances of all the unknown samples for the light at the wavelength $\lambda_1$ are lower than the threshold, the concentration measurement processing unit 153 does not perform the measurement by using the second calibration curve. In short, only when at least one of the concentrations of the unknown samples for the light at the wavelength $\lambda_1$ is equal to or more than the threshold, the concentration measurement processing unit 153 may irradiate this unknown sample with the light at the wavelength $\lambda_2$. Then, based on the absorbance and second calibration curve obtained, the concentration measurement processing unit 153 may measure a concentration of the target composition in the unknown sample.

5. Concentration Measurement Process

Figure 5:
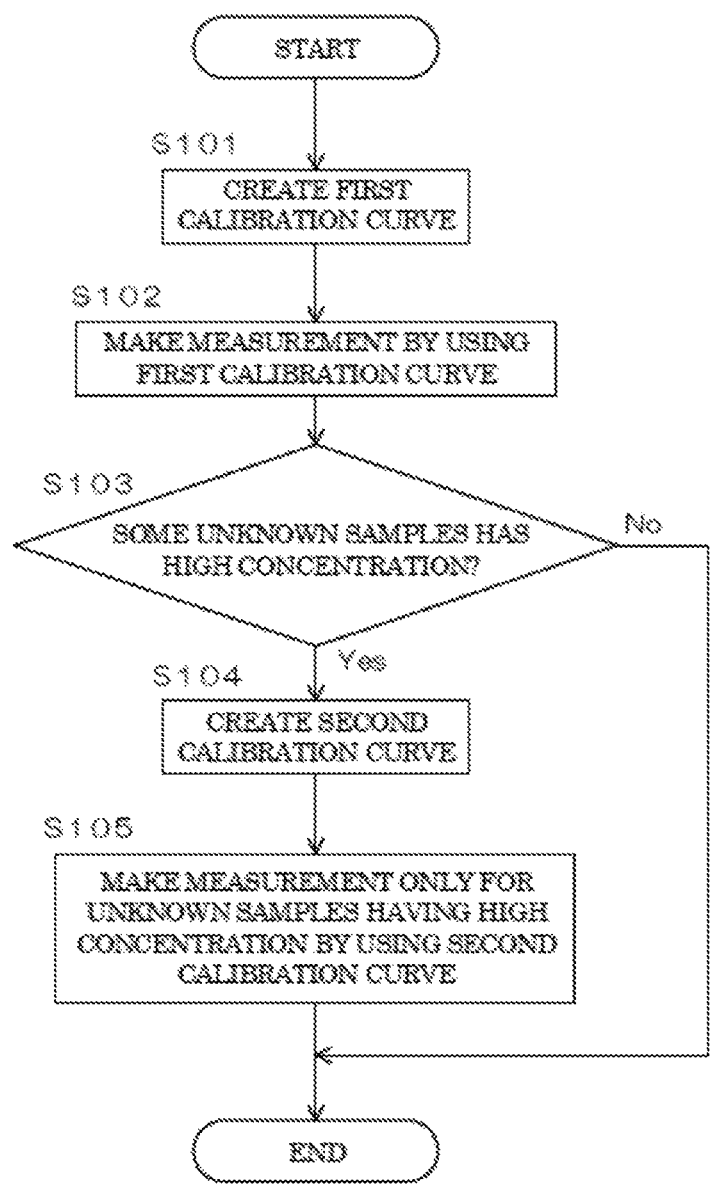
FIG. 5 is a flowchart of a process in which a controller measures concentrations of a plurality of unknown samples.

FIG. 5 is a flowchart of a process in which the controller 15 measures concentrations of a plurality of unknown samples.

When the atomic absorption spectrophotometer measures concentrations of a plurality of unknown samples, the first calibration curve creation processing unit 151 first creates the first calibration curve by using the first standard sample (step S101: first calibration curve creating step). Then, the concentration measurement processing unit 153 makes the measurement for the unknown samples by using the first calibration curve and the light at the wavelength $\lambda_1$ (step S102). In short, the calibration curve creation processing unit 150 sequentially conveys the plurality of unknown samples to the atomization unit 12. Then, the concentration measurement processing unit 153 measures concentrations of the target samples in the unknown samples, based on the first calibration curve and detection signals from the detector 13 which indicate the intensities of light at wavelength $\lambda_1$ that have passed through the atomized unknown samples.

The concentration measurement processing unit 153 compares the absorbances of the unknown samples which are calculated based on the detection signals from the detector 13 with a predetermined threshold. When the absorbances of all the unknown samples are lower than the threshold (No in step S103), the concentration measurement processing unit 153 regards the concentrations of the target samples in the unknown samples which have been measured in step S102 as resultant measurements.

When at least one of the absorbances of all the unknown samples is equal to or more than the threshold (Yes in step S103), the second calibration curve creation processing unit 152 creates the second calibration curve by using the second standard sample (step S104: second calibration curve creating step). Then, the concentration measurement processing unit 153 selects, from among the plurality of unknown samples, the unknown sample with a high concentration whose absorbance for the light at the wavelength $\lambda_1$ is equal to or more than the threshold, and makes the measurement only for the selected sample by using the second calibration curve and the light at the wavelength $\lambda_2$ (step S105).

In short, the monochromator 111 switches from the wavelength $\lambda_1$ to wavelength $\lambda_2$ of the light from the light source unit 11, and the calibration curve creation processing unit 150 conveys only the unknown sample with the high concentration to the atomization unit 12 again. Then, the concentration measurement processing unit 153 measures a concentration of the target composition in the unknown sample with the high concentration, based on a detection signal from the detector 13 which indicates the intensity of light at the wavelength $\lambda_2$ that has passed through the atomized unknown sample and the second calibration curve. Steps S102, S103, and S105 constitute a concentration measuring step in which a concentration of a target composition in an unknown sample is measured.

6. Effect (1) In this embodiment, when an absorbance of an unknown sample for light at the wavelength $\lambda_1$ is less than a threshold (No in step S103), an atomic absorption spectrophotometer measures a concentration of a target composition in the unknown sample in a conventional manner, more specifically, based on the absorbance of the unknown sample for the light at the wavelength $\lambda_1$ and the first calibration curve (in step S102). In this case, the atomic absorption spectrophotometer makes the measurement within a range in which the calibration curve exhibits good linearity, and precise measurement thereby can be made. When the absorbance of the unknown sample for the light at the wavelength $\lambda_1$ is equal to or more than the threshold (Yes in step S103), the atomic absorption spectrophotometer irradiates the unknown sample with light at the wavelength $\lambda_2$ differing from the wavelength $\lambda_1$, thereby lowering the absorbance. In this case, the atomic absorption spectrophotometer can also precisely measure a concentration of the target composition in the unknown sample by using the second calibration curve that represents the relationship between an absorbance of the second standard sample whose concentration is higher than that of the first standard sample and the concentration of the target composition in the second standard sample (step S105).

As described above, the atomic absorption spectrophotometer switches between the wavelengths $\lambda_1$ and $\lambda_2$ of the light with which the unknown sample is to be irradiated, depending on the absorbance of the unknown sample, thereby successfully making precise measurement for the unknown sample even if the unknown sample has a high concentration. In addition, if measuring a plurality of unknown samples, the atomic absorption spectrophotometer does not have to dilute each individual unknown sample, thereby successfully suppressing an occurrence of a dilution error and complication of measurement procedures.

(2) In this embodiment, only when the absorbance of the unknown sample for the light at the wavelength $\lambda_1$ is equal to or more than a threshold (Yes in step S103), the atomic absorption spectrophotometer creates the second calibration curve (step S104). Therefore, if the absorbance of the unknown sample for the light at the wavelength $\lambda_1$ is less than the threshold (No in step S103), the atomic absorption spectrophotometer does not have to create the second calibration curve, thereby suppressing complication of measurement procedures.

(3) In this embodiment, when measuring a plurality of unknown samples, the atomic absorption spectrophotometer irradiates, with the light at the wavelength $\lambda_2$, only one or more of the unknown samples whose respective absorbances for the light at the wavelength $\lambda_1$ are equal to or more than the threshold. Then, based on the absorbances of the irradiated unknown samples and the second calibration curve, the atomic absorption spectrophotometer measures concentrations of the target compositions in the irradiated unknown sample (step S105). Therefore, if measuring a plurality of unknown samples, when the absorbances of all the unknown samples for the light at wavelength $\lambda_1$ are less than the threshold (No in step S103), the atomic absorption spectrophotometer does not have to switch from the wavelength $\lambda_1$ to the wavelength $\lambda_2$ of the light with which the unknown samples are to be irradiated. This successfully suppresses complication of measurement procedures.

7. Modification

In the foregoing embodiment, the atomic absorption spectrophotometer is configured to, only when an absorbance of an unknown sample for the light at the wavelength $\lambda_1$ is equal to or more than the threshold (Yes in step S103), create the second calibration curve (step S104). However, this configuration is not limited. Alternatively, the atomic absorption spectrophotometer may be configured to, in advance, create both the first and second calibration curves and store these curves in the storage unit 18. Then, the atomic absorption spectrophotometer may be configured to make measurement for an unknown sample by using the second calibration curve only as needed.

In the embodiment, the flame-type atomic absorption spectrophotometer that atomizes a sample in the flame 2 has been described. However, the present invention is not limited to a flame-type atomic absorption spectrophotometer, and applicable to a furnace-type or other type of atomic absorption spectrophotometer, for example.

In the foregoing embodiment, the light source unit 11 switches wavelengths (pre-spectral); however, a unit that switches the wavelengths may be disposed between the atomization unit 12 and the detector 13 (post-spectral).

DESCRIPTION OF REFERENCE SIGNS 1 atomic absorption spectrophotometer
2 flame
11 light source unit
12 atomization unit
13 detector
14 photometer
15 controller
16 display unit
17 operation unit
18 storage unit
111 monochromator
121 burner
150 calibration curve creation processing unit
151 first calibration curve creation processing unit
152 second calibration curve creation processing unit
153 concentration measurement processing unit

The invention claimed is:

1. An atomic absorption spectrophotometer that atomizes an unknown sample, irradiates the unknown sample with light, and measures a concentration of a target composition in the unknown sample based on an absorbance of the unknown sample, the atomic absorption spectrophotometer comprising:

a storage unit that stores a first calibration curve and a second calibration curve, the first calibration curve representing a relationship between an absorbance of a first standard sample for light at a first wavelength and a concentration of the target composition in the first standard sample, the second calibration curve representing a relationship between an absorbance of a second standard sample for light at a second wavelength and a concentration of the target composition in the second standard sample, the second standard sample having a higher concentration than a concentration of the first standard sample, the second wavelength differing from the first wavelength;

a concentration measurement processing unit that, when the absorbance of the unknown sample for the light at the first wavelength is less than a threshold, measures the concentration of the target composition in the unknown sample based on the absorbance of the unknown sample for the light at the first wavelength and the first calibration curve and that, when the absorbance of the unknown sample for the light at the first wavelength is equal to or more than the threshold, measures the concentration of the target composition in the unknown sample based on the absorbance of the unknown sample for the light at the second wavelength and the second calibration curve;

a first calibration curve creation processing unit that creates the first calibration curve and stores the first calibration curve in the storage unit; and a second calibration curve creation processing unit that creates the second calibration curve and stores the second calibration curve in the storage unit, wherein when the absorbance of the unknown sample for the light at the first wavelength is equal to or more than the threshold, the second calibration curve creation processing unit creates the second calibration curve and stores the second calibration curve in the storage unit.

2. The atomic absorption spectrophotometer according to claim 1, wherein the concentration measurement processing unit irradiates, with the light at the second wavelength, only one or more of a plurality of unknown samples whose respective absorbances for the light at the first wavelength are equal to or more than the threshold, and measures concentrations of the target composition in the irradiated unknown samples based on the absorbances of the irradiated unknown samples and the second calibration curve.

3. An atomic absorption measurement method of atomizing an unknown sample, irradiating the unknown sample with light, and measuring a concentration of a target composition in the unknown sample based on an absorbance of the unknown sample, the atomic absorption measurement method comprising:

a first calibration curve creating step of creating a first calibration curve that represents a relationship between an absorbance of a first standard sample for light at a first wavelength and a concentration of the target composition in the first standard sample;

a second calibration curve creating step of creating a second calibration curve that represents a relationship between an absorbance of a second standard sample for light at a second wavelength and a concentration of the target composition in the second standard sample, the second standard sample having a higher concentration than a concentration of the first standard sample, the second wavelength differing from the first wavelength; and a concentration measuring step of, when the absorbance of the unknown sample for the light at the first wavelength is less than a threshold, measuring the concentration of the target composition in the unknown sample based on the absorbance of the unknown sample for the light at the first wavelength and the first calibration curve and, when the absorbance of the unknown sample for light at the first wavelength is equal to or more than the threshold, measuring the concentration of the target composition in the unknown sample based on the absorbance of the unknown sample for the light at the second wavelength and the second calibration curve, wherein the second calibration curve creating step includes a step of, when the absorbance of the unknown sample for the light at the first wavelength is equal to or more than the threshold, creating the second calibration curve.

4. The atomic absorption measurement method according to claim 3, wherein the concentration measuring step includes a step of irradiating, with the light at the second wavelength, only one or more of a plurality of unknown samples whose respective absorbances for the light at the first wavelength are equal to or more than the threshold, and measuring concentrations of the target composition in the irradiated unknown samples based on the absorbances of the irradiated unknown samples and the second calibration curve.

* * * * *